United States Patent [19]

Rounds

[11] Patent Number: 4,514,439
[45] Date of Patent: Apr. 30, 1985

[54] DUST COVER

[75] Inventor: Nicholas A. Rounds, New Britain, Pa.

[73] Assignee: Rohm and Haas Company, Philadelphia, Pa.

[21] Appl. No.: 533,096

[22] Filed: Sep. 16, 1983

[51] Int. Cl.³ .............................................. B05D 3/06
[52] U.S. Cl. .................................. 427/54.1; 427/240; 427/420; 427/421
[58] Field of Search ...................... 427/54.1, 421, 420, 427/240

[56] References Cited

U.S. PATENT DOCUMENTS

| | | | |
|---|---|---|---|
| 3,198,657 | 8/1965 | Kimball et al. | 427/240 |
| 4,169,005 | 9/1979 | Fogle et al. | 427/54.1 |
| 4,179,532 | 12/1979 | Soeding | 427/54.1 |
| 4,210,703 | 7/1980 | Scantlin et al. | 427/54.1 |
| 4,323,591 | 4/1982 | Wendling et al. | 427/54.1 |
| 4,404,247 | 9/1983 | Dominguez-Burguette et al. | 427/54.1 |
| 4,407,855 | 10/1983 | Russell | 427/54.1 |
| 4,430,363 | 2/1984 | Daniels et al. | 427/54.1 |

Primary Examiner—Norman Morgenstern
Assistant Examiner—Janyce A. Bell
Attorney, Agent, or Firm—Jordan J. Driks

[57] ABSTRACT

Process for forming an optically transparent polymeric protective layer for an information disc. The disc is placed in a stationary horizontal position and a liquid radiation curable coating is applied to the surface of the disc from an applicator disposed above the disc. Coating of the disc is accomplished by equally spaced sequential movement of an applicator which is on a plane parallel to the surface of the stationary disc. The liquid coating is then allowed to spread evenly across the disc surface and is thereafter cured by means of radiation.

13 Claims, No Drawings

DUST COVER

BACKGROUND OF THE INVENTION

This invention relates to a process for the manufacture of coatings for infomation discs. More particularly, this invention relates to the formation of optically transparent polymeric coatings for information discs which will prevent dust from coming into contact with the information disc. Although this invention will be described in terms of an information disc, it should be understood that the information storage device may have a shape other than that of a disc and such other shape is included in the scope of this invention.

Information storage discs may be prepared by using, for example, a laser to mark the surface of the disc with a retrievable information code. This marking may take the form of pits, a number of which may form a byte. In the interest of clarity and simplicity, the marks on the disc surface will be referred to as pits and the term "byte" may include a plurality of pits although the invention is not to be construed as limited to a marking which forms only pits. An information disc may contain, for example, several billion pits per disc. Each pit or series of pits represents a letter or a number. When the information is to be read from the disc, such reading is generally done by laser. The laser may be the same one which has been used to burn the information into the disc or may be a different laser. The laser uses converging light to read the pits of the disc. It therefore becomes important that the laser by focused properly so that the light will converge on the surfac eof the disc. If the laser is not focused properly or if a foreign object, such as a fine dirt particle, is on the surface of the disc then the pit will be obscured and will not be read by the laser. This will then affect the retrieval of information from the information disc. Because the laser uses converging light, it has become common practice to cover the surface of the information disc with an optically transparent polymeric protective layer to keep dust, and other foreign matter, from the surface of the disc. Because the reading laser utilizes converging light, which is wide as it enters the polymeric protective layer, any dust will not adversely affect the reading of the information disc since it will be focused past the dust on the protective layer and directly on the pit which is on the information disc.

The polymeric protective layer must itself be perfectly flat and optically transparent. If the polymeric protective coating is not flat, then the focus of the laser onto the disc surface is adversely affected.

When the polymeric protective layer is formed on the disc itself, the disc is rotated and a radiation curable coating is poured onto the information disc. Centrifical force throws the coating out toward the edges of the disc, and in this manner the disc is coated and the casting is then radiation cured.

The disadvantage of the aforedescribed proccess is that, because of the centrifical force, the coating assumes a wedge shape and develops waves, much as waves develop when a pebble is dropped into a still pool of water. In order to eliminate these waves, it is necessary to allow the coating to sit for a long period of time, uncured, on the disc which is now in a stationary position, to allow these waves to flow out. However, because of the centrifical force, the wedge, which was formed because of such force, collapses and forms its own waves which keep oscillating and which requires extended periods of time to flow out. Thus, there are two waves which are formed when the aforedescribed process is used. The first waves, which flow out quickly, are those which have been formed by the stream of liquid onto the disc surface and the second waves, which require a long period of time to dissipate, are those which have been formed due to collapse of the wedge shaped coating which has been formed through centrifical force.

Once all waves have dissipated from the disc, the coating is then exposed to radiation, such a UV light, and becomes a solid, flat, optically transparent coating.

It is an object of this invention to provide a process for forming a radiation curable coating onto an information disc.

Another object of this inveiton is to form said coating while minimizing the time required for the coating to become flat before curing.

other objects and advantages will become apparent from the following more complete description and claims.

DETAILED DESCRIPTION

Broadly, this invention contemplates a process for forming an optically transparent polymeric protective layer on an information disc which comprises, placing the disc in a stationary horizontal position, applying a liquid radiation curable coating to the surface of said stationary disc from an applicator disposed above the disc and preferably at a distance form the surface of said disc of up to about 25 cm., applying said coating by equally spaced sequential movement of said applicator on a plane parallel to the surface of said stationary disc, allowing said liquid coating to spread evenly across said disc surface, and curing said coating by means of radiation to form a thin, even, optically transparent polymeric protective layer over said disc.

It is surprising that an optically transparent polymeric protective layer for an information disc can be prepared by maintaining the disc in a stationary horizontal position while moving the applicator containing the radiation curable coating and that when the coating is applied to the disc in this manner, the time required for the waves to disssipate and for the coating to become completely flat is greatly minimized.

The radiation curable coating composition may be composed of only the radiation curable monomer or it may contain other components such as oligomer, photoinitiator if ultlra violet radiation is to be used to cure the composition, surfactant, a flow aid to assist the composition in flowing across the surface of the information storage disc and a stabilizer.

Any radiation curble monomer may be used which will result in a optically transparent coating when cured. Generally, any ethylenically unsaturated monomer may be used which is capable of being cured into an optically transparent coating. Among the monomers which may be used are acrylates or methacrylates which are free radical polymerizable and which have one or more ethylenically unsaturated groups. This class includes vinyl monomers, allyl monomers as well as the aforesaid acrylic and methacrylic monomers. The monomers which may be used also include vinyl ethers, N-vinyl monomers, and epoxy monomers which polymerize by means of a cationic ring opening. The vinyl ether, N-vinyl monomers and epoxy monomers may be used in conjunction with cationic photoinitiator as is set forth in U.S. Pat. Nos. 4,108,747; 4,102,687; 4,058,401; and 4,058,400.

Among the monomers which may be used are pentaerythritol tetraacrylate and triacrylate, tris(2-acryloxyethyl)isocyanurate, tris(2-methyacryloxyethyl)isocyanaurate, 2-acetoxyethyl methacrylate, tetrahydrofurfurylmethacrylate, diacetone acrylamide, acrylamidoethyl methacrylae, 1,6-hexane diol diacrylate, tetra ethylene glycol diacrylate, 1,4-butane diol dimethacrylate, tripropylene glycol diacrylate, diethylene glycol diacrylate, diethylene glycol dimethacrylate, ethylene glycol diacrylate, neopentyl glycol diacrylate, butyl acrylate, isobutyl acrylate, butyl methacrylate, glycidyl acrylate, glycidyl methacrylate, isobornyl acrylate, cyclohexyl acrylate, phenyl acrylate, tertiarybutyl acrylate, trimethylol propane triacrylate, glycerol triacrylate, and the like.

The monomer may comprise the entire radiation curable coating composition or it may be present in an amount of from about 20 to about 100 parts by weight of the entire composition.

An oligomer may be present in an amount of from 0 to about 60 parts by weight of the entire composition. The oligomer, if present, may be a halogenated oligomeric ester acrylate, acrylated urethane, acrylated epoxy, or methacrylate monomer which is compatible with the monomer set forth above. The oligomer must also be compatible with any initiator which may be present.

Among the oligomers which may be used is a halogenated polyester acrylate such as those set forth in U.S. Pat. No. 4,227,978, which is incorporated herein by reference.

the radiation curable coating may also have from about 0.1 to about 12 parts by weight of a photoinitiator if the coating is to be ultra violet cured. Among the initiators which may be used are organic peroxides, azo compounds, aromatic diazonium salts, aromatic iodonium salts, aromatic sulfonium salts, aromatic phosphonium salts, quinones, benzophenones, nitroso compounds, acyl halides, aryl halides, hydrazones, mercapto compounds, pyrylium compounds, triarylimidazoles, biimidazoles, chloroalkyltriazines and the like. Such photoinitiators are well known in the art.

From 0 to about 5 parts of a surfactant may also be present. Among the surfactants which may be present are alkylphenol-ethylene oxide condensates such as the Triton ® surfactant series manufactured by Rohm and Haas Company; non-ionic acetylenic glycols such as the Surfynol © surfactant series obtained from Air Products and Chemical Inc.; hydrocarbon-fluorocarbon block oligomers such as the Fluorad © surfactant series obtained from Minnesota Mining and Manufacturing Co.; and the like.

A flow aid is often present. Although the flow aid is not necessary, such flow aid may be present in amounts of up to about 5 parts by weight. Among the flow aids which may be present are acrylic Modaflow © and Multiflow © polymers obtained from Monsanto Corporation, Byk © 300 series, of flow aids obtained from Byk-Mallinckrodt Corporation, and the like.

If desired, a stabilizer may be present in an amount of up to about 1 part by weight in order ot prevent premature polymerization of the monomer containing coating composition during storage.

Among the stabilizers which may be used are hydroquinone and its ethers, phenothiazine, and the like.

If desired, an epoxide or other cationic polymerizable material may be included in the compositions of this invention. The epoxide may be used in an amount of up to about 95 parts by weight of the composition. Among the epoxides which may be used are 3,4-epoxycyclohexylmethyl 3,4-epoxycyclohexanecarboxylate obtained from Union Carbide Company, Epon 828 (a polymer produced by the condensation reaction of epichlorohydrin with bisphenol A) obtained from Shell Chemical Company, and the like.

The process of this invention is practiced by placing the liquid radiation curable coating in a reservoir which is equipped with an electric motor and a nozzle through which the coating composition is applied. The electric motor is connected to the applicator to enable the applicator to move in various directions. In order to avoid the splashing of the coating composition beyond the information disc surface, the applicator, through which the coating is applied, is kept at a maximum distance of up to about 25 centimeters above the surface of the information storage disc. The movement of the applicator may be any suitable movement such as from side to side or in a spiral manner. The movement is spaced so that the coating, when applied to the surface of the information storage disc, will spread across part of the surface and will meet the coating which has been applied on another part of the information storage disc. Preferably, the coating is applied in an outwardly spiral manner.

After the coating is applied to the information storage disc, it is allowed to sit for a period of from about 1 minute to about 30 minutes to allow the waves to flow out of the coating so that the coating, prior to being cured, is flat.

After the waves have dissipated from the coating, the storage information disc which has been coated is then exposed to radiation such as ultra violet radiation, electron beam radiation, or visible light radiation and the like and the coating is thereby formed into a hard, cured optically transparent coating.

In order to more fully illustrate the nature of this invention and the manner of practicing the same, the following Examples are presented.

EXAMPLE

The process of this invention may be performed in the following manner.

An information disc blank measuring 14 inches in diameter is placed on a platform. Suspended above the information disc is a moveable coating device which comprises a reservoir in which the liquid coating composition is deposited, a nozzle through which the coating composition is applied to the information disc and an electric motor to move the nozzle in a spiral manner. The tip of the nozzle, through which the coating composition is applied to the disc, is maintained at a distance of 8 centimeters above the surface of the disc. A coating composition containing, by weight, 96.9 percent of neopentyl glycol di(beta-acryloxypropionic acid), 3.0 percent of 1-hydroxy cyclohexyl phenyl ketone (a photo initiator) and 0.1 percent of Fluorad FC-430 (surfactant) is placed in the resevoir. The nozzle is opened and the electric motor actuated so that the nozzle moves in a spiral manner and deposits a stream of the coating composition across the disc. The nozzle moves so that the stream of coating composition is deposited on the disc 9 millimeters from the previous and subsequent deposition of the coating composition on the disc.

The coating composition spreads across the surface of the disc and is allowed to stand quiescent for 5 minutes to allow the waves to flow out. The coating composition is then cured using ultra violet radiation. A flat optically transparent polymeric protective layer which adheres to the disc is obtained.

While the invention has been described in terms of certain preferred embodiments and illustrated by means of a specific example, the invention is not to be construed as limited except as set forth in the following claims.

I claim:

1. A process for forming an optically transparent polymeric protective layer on an information disc which comprises, placing the disc in a stationary horizontal position, applying a monomer containing liquid radiation curable coating to the surface of said stationary disc from an applicator disposed above the disc, applying said coating by equally spaced sequential movement of said applicator on a plane parallel to the surface of said staitonary disc, allowing said liquid coating to spread evenly across said disc surface, and curing said coating by means of radiation to form a thin, even, optically transparent polymeric protective layer over said disc.

2. A process according to claim 1 wherein said monomer is tripropylene glycol diacrylate.

3. A process according to claim 1 wherein said monomer is tetraethylene glycol diacrylate.

4. A process according to claim 1 wherein said monomer is neopentyl glycol diacrylate.

5. A process according to claim 1 wherein said monomer is ethylene glycol diacrylate.

6. A process accroding to claim 1 wherein said monomer is diethylene glycol diacrylate.

7. A process according to claim 1 wherein said monomer is diethylene glycol dimethacrylate.

8. A process according to claim 1 wherein said monomer is an epoxy monomer capable of polymerizing by a cationic ring opening.

9. A process according to claim 1 wherein said applicator moves in a repeated incremental spiral manner.

10. A process according to claim 1 wherein said distance between said applicator and the surface of the disc is up to about 25 centimeters.

11. A process according to claim 1 wherein said radiation is ultra violet radiation.

12. A process according to claim 1 wherein said liquid monomer has a viscosity of from about 5 to about 500 centipoises.

13. A process according to claim 1 wherein said monomer is neopentyl glycol di(beta-acryloxypropionic acid).

* * * * *